United States Patent [19]

Dondich

[11] Patent Number: 5,121,161
[45] Date of Patent: Jun. 9, 1992

[54] EXPOSURE UNIT

[76] Inventor: Kirk Dondich, 924 Arcadia Ave., Arcadia, Calif. 91007

[21] Appl. No.: 681,772

[22] Filed: Apr. 8, 1991

[51] Int. Cl.⁵ ............................................. G03B 27/20
[52] U.S. Cl. .......................................... 355/94; 355/93
[58] Field of Search .............................. 355/91, 93, 94

[56] References Cited

U.S. PATENT DOCUMENTS

| | | | |
|---|---|---|---|
| 1,742,372 | 1/1930 | Taylor | 355/94 |
| 3,224,353 | 12/1965 | Jones | 355/94 |
| 3,625,611 | 12/1971 | Orr et al. | 355/91 |
| 4,484,813 | 11/1984 | Maher et al. | 355/94 |
| 4,536,085 | 8/1985 | Hliboki et al. | 355/94 |

Primary Examiner—Monroe H. Hayes
Attorney, Agent, or Firm—James E. Brunton

[57] ABSTRACT

An exposure unit for exposing photo-stencil materials in which the light box portion of the unit is continuously cooled by the vacuum pump that operates the vacuum frame portion of the unit. The vacuum pump is mounted internally of the light box portion of the unit and is interconnected with the vacuum frame by a direct interconnection so that a vacuum hose is not required. The unit also icludes a base for supporting the light box and vacuum frame which includes a light-tight, ventilated storage area for the storage of light sensitive materials.

10 Claims, 4 Drawing Sheets

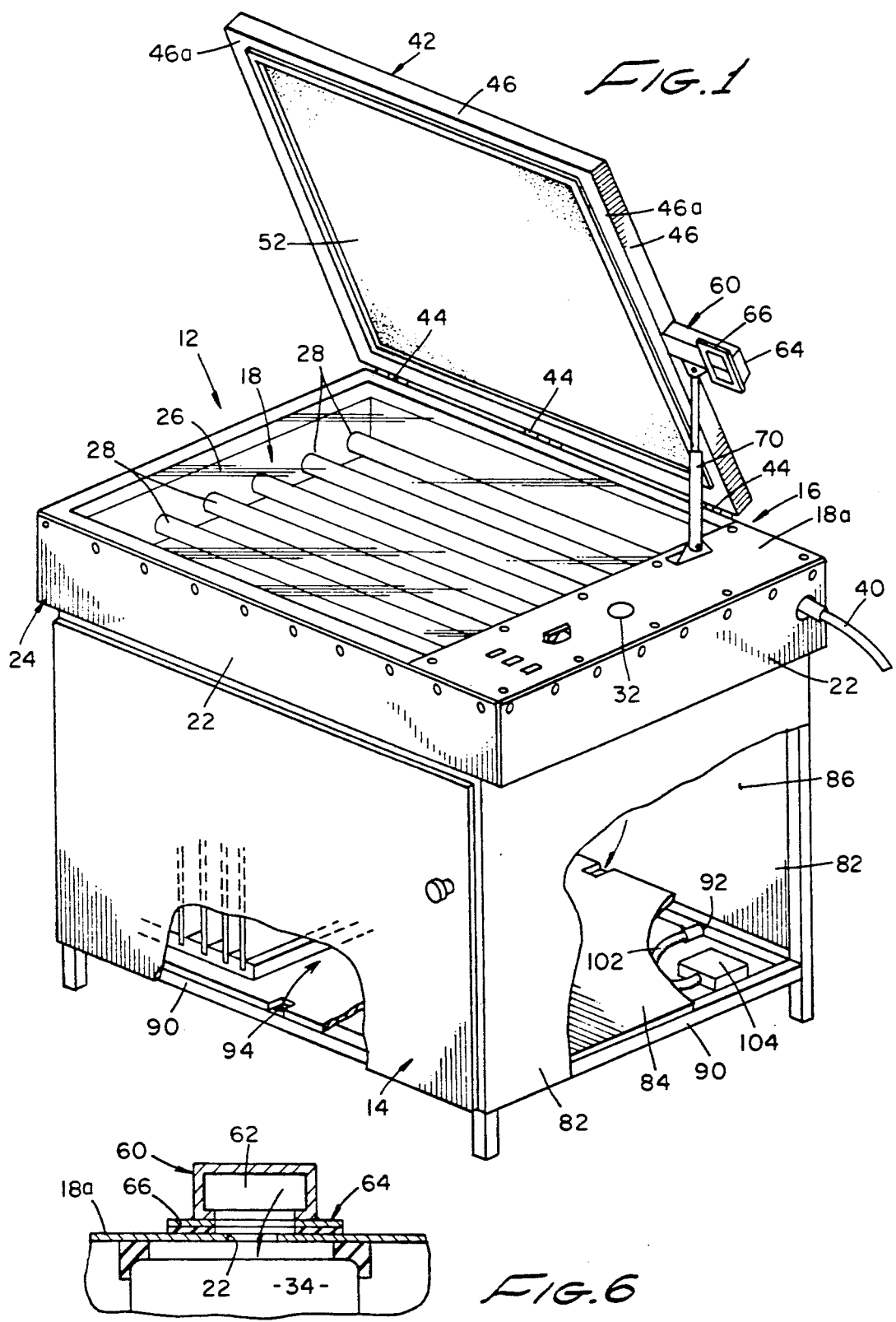

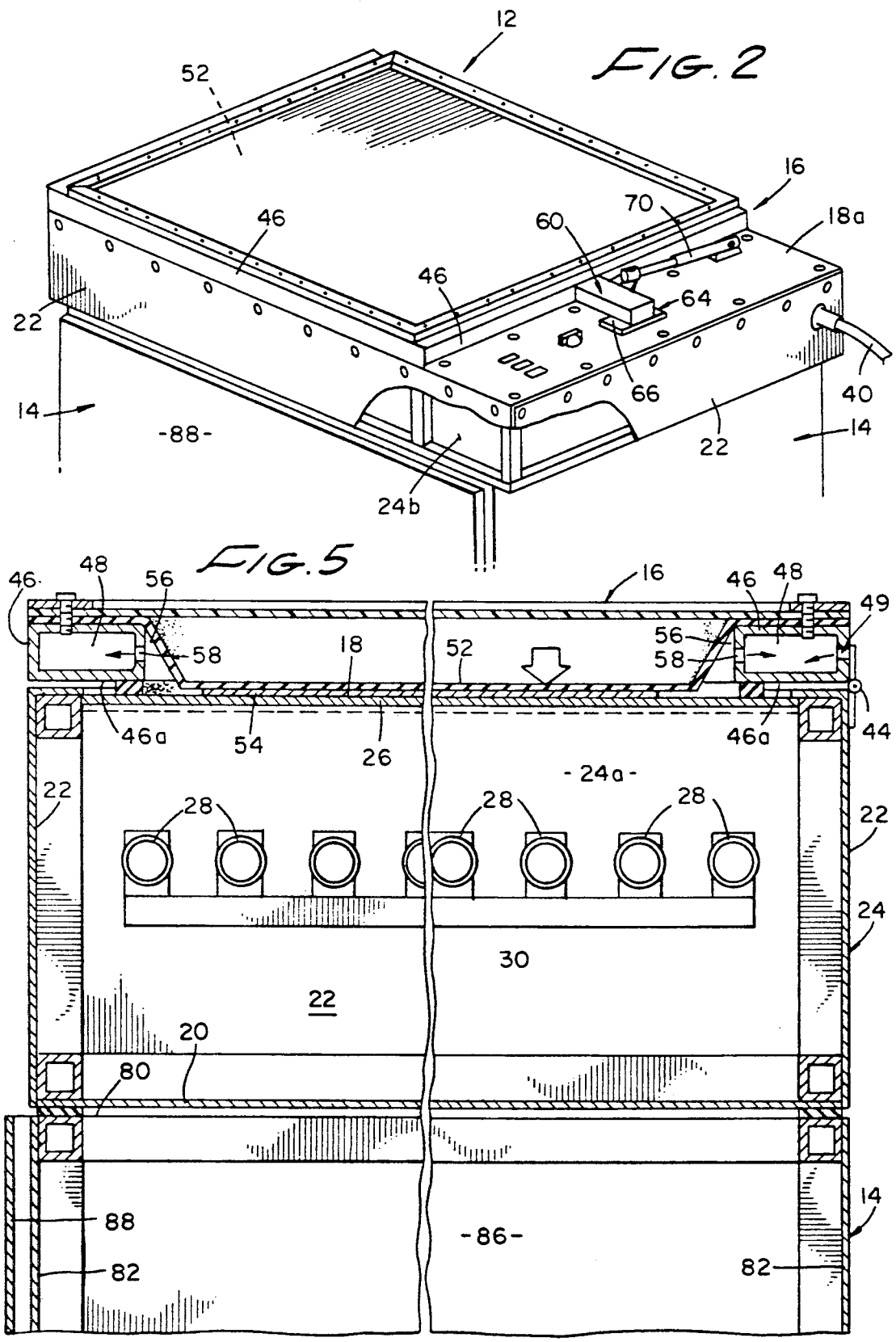

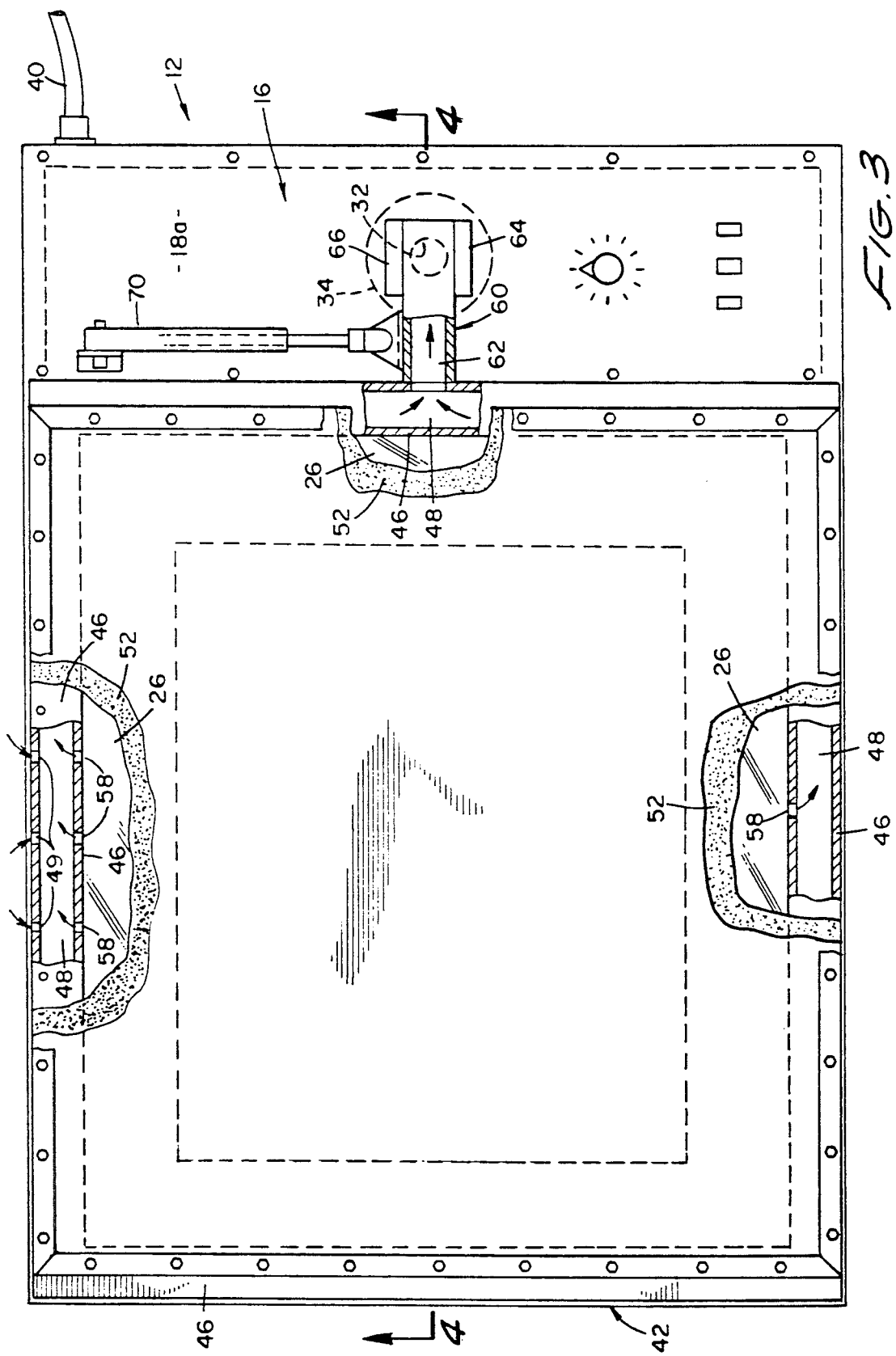

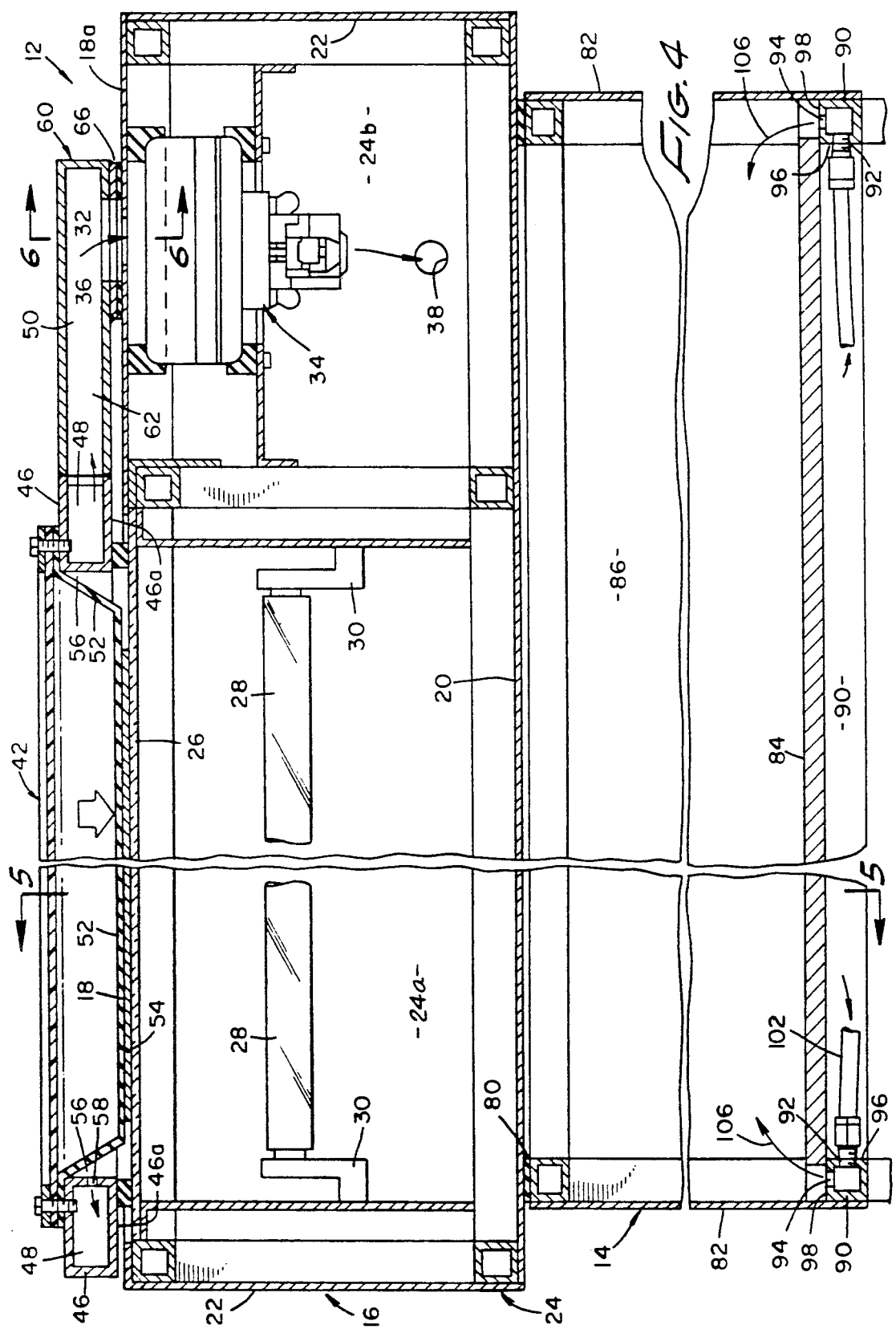

EXPOSURE UNIT

BACKGROUND OF THE INVENTION

1. Field of the Invention

The present invention relates generally to exposure units for controllably exposing light sensitive photographic materials to a light source. More particularly, the invention concerns a top loading, vacuum exposure unit for exposing photostencil materials to a source of light.

2. Discussion of the Invention

Several types of exposure units for exposing photostencil materials have been developed in the past. Typically these units comprise a light box having a glass top superimposed over a series of fluorescent lights. Mounted over the light box is a vacuum frame which includes a flexible mat that can be tightly drawn over the stencil by a vacuum pump so that the stencil is pressed firmly against the glass top of the exposure unit. Exemplary of prior art exposure units are those sold by McLogan Supply Co., Inc., of Los Angeles, California and by Screen Process Equipment Company of Atlanta, Georgia.

As a general rule in the prior art exposure units, the vacuum pump, which operates the vacuum frame, is typically mounted within the light box either below or to one side of the bay of fluorescent lights. A connector hose usually passes through the rear wall of the light box and interconnects the inlet of the vacuum pump and the outlet port of the vacuum frame. When the vacuum pump is energized, air is drawn from between the flexible mat and the stencil and through the hollow tubular sides of the vacuum frame to the inlet of the vacuum pump. With this construction, continuous operation of the vacuum pump causes the light box to become extremely hot making the unit difficult to work with and causing rapid degradation of the operating components of the unit. Further, because the vacuum hose typically extends from the back of the unit, the exposure unit cannot be located against a wall, but must be inconviently spaced apart from the wall a substantial distance. This results in lost floor space and exposes the vacuum hose to potential damage if the unit is accidentally pushed against the wall.

It is these drawbacks of the prior art units, namely the overheating problem caused by the improperly designed vacuum system, which the present invention uniquely overcomes. As will be discussed in greater detail hereinafter, the apparatus of the present invention embodies a vacuum pump having a thru-flow vacuum motor which continuously draws outside air through the vacuum frame causing substantial cooling rather than undesirable heating of the light box. The vacuum pump is interconnected directly with the vacuum frame by means of a novel direct connection so that no external connector hose is required. This enables the unit to be located against a wall and effectively prevents damage to the vacuum system. Additionally, the apparatus of the present invention includes a unique light-tight base which supports the light box and vacuum frame and provides safe and convenient storage for light sensitive materials. The base is also of a unique design allowing efficient ventilation of the storage compartment while maintaining the light-tight integrity thereof.

SUMMARY OF THE INVENTION

It is an object of the present invention to provide an exposure unit for exposing photo-stencil materials in which the light box portion of the unit is continuously cooled by the vacuum pump that operates the vacuum frame portion of the unit.

Another object of the invention is to provide an exposure unit of the aforementioned character in which the vacuum pump is mounted internally of the light box portion of the unit and is interconnected with the vacuum frame by a direct interconnection so that a vacuum hose is not required.

Another object of the invention is to provide a base for supporting the light box and vacuum frame which includes a light-tight, ventilated storage area for the storage of light sensitive materials.

Still another object of the invention is to provide an exposure unit of the character described in the preceding paragraphs which is compact, easy to use and requires minimum maintenance and repair.

BRIEF DESCRIPTION OF THE DRAWINGS

FIG. 1 is a generally perspective view of the Exposure Unit and light-tight storage cabinet.

FIG. 2 is a perspective view similar to FIG. 1 but showing the cover of the Exposure Unit in a closed position.

FIG. 3 is a top view of the apparatus partly broken away to show internal construction.

FIG. 4 a cross-sectional view taken along lines 4—4 of FIG. 3.

FIG. 5 is a cross-sectional view taken along lines 5—5 of FIG. 4.

FIG. 6 is a cross-sectional view taken along lines 6—6 of FIG. 4.

DESCRIPTION OF THE INVENTION

Referring to the drawings and particularly to FIGS. 1, 2 and 3, the exposure unit of the present invention for exposing photo-stencil materials is generally designated by the numeral 12. In the form of the invention shown in the drawings, the exposure unit comprises a base unit 14 and a light box assembly 16 mounted on base unit 14.

The light box assembly 16 comprises interconnected top, bottom and side walls 18, 20 and 22 respectively defining an enclosure 24. (See also FIG. 5). As best seen by referring to FIG. 4, enclosure 24 is divided into two parts 24a and 24b. Part 24a is covered by a top wall, at least of portion of which, is transparent, as for example, a sheet of plate glass 26. Disposed interiorly of enclosure 24a is a source of light here shown as a plurality of fluorescent lights 28. Fluorescent lights 28 are mounted on brackets 30 and are interconnected with a source of electric power in a manner well known to those skilled in the art.

Part 24b of enclosure 24 is covered by a metal cover 18a which is provided with a vacuum port 32 (FIG. 1). Mounted within enclosure part 24b is a vacuum pump 34 having a vacuum inlet 36 in communication with vacuum port 32 provided in top wall 18 of the light box assembly. Vacuum pump 34 is of a through-flow character of a type readily commercially available from sources such as Amatec of Kent, Ohio. The motor of the vacuum pump is cooled by the discharge of vacuum air from the blower section of the apparatus and, rather than generating heat within enclosure portion 24b, functions to continuously cool the enclosure as the apparatus is in use. After the discharged air passes through and cools enclosure portion 24b, it is exhausted from the apparatus through an exhaust port 38 (FIG. 4). Electric power is supplied to vacuum pump 34 via an electric power cord 40 which extends through one of the side walls 22 of the apparatus (See FIG. 1).

An important feature of the apparatus of the present invention is the vacuum frame assembly 42 which is hingeably connected to light box assembly 16 by means of longitudinally spaced hinges 44. As best seen by referring to FIGS. 4 and 5, vacuum frame assembly 42 comprises a hollow, tubular frame 46 having a first surface 46a adapted to overlay the top wall of the light box assembly 16. Frame 46 is provided with interconnected walls defining an internal passageway 48 which is in communication with an internal passageway 50 of a connector means, the details of which will presently be described.

A flexible mat 52 is connected to tubular frame 46 and is deformable from a generally planar configuration shown in FIG. 2 into a deformed configuration shown in FIG. 4 wherein the mat is in close engagement with an article 54 resting on glass plate 26 (FIG. 4). In its first generally planar configuration, mat 52 defines an interior space between glass plate 26 and the lower surface of mat 52. This interior space, identified in the drawings by the numeral 56, is in communication with a plurality of apertures 58 formed in frame 46 of the vacuum frame assembly (FIG. 4). With this construction, when air is drawn from space 56 through apertures 58 and into passageways 48 of the frame in a manner presently to be described, mat 52 will be deformed from its first planar configuration into its second deformed configuration securely clamping article 54 against glass plate 26. Referring to FIG. 3, it is to be noted that frame 46 is also provided with a plurality of apertures 60 which communicate with atmosphere exterior of the exposure unit.

Referring particularly to FIGS. 1 and 3, the connector means of the apparatus for interconnecting the internal passageway 48 of frame 46 with the inlet 36 of the vacuum pump 34 comprises a connector element 60 which extends outwardly from one side of frame 46. Connector 60 is tubular in shape having an internal passageway 62 in communication with passageway 48 of frame 46 (FIG. 3). Passageway 62 is also in communication with a coupler head 64 provided on the outboard end of coupler element 60. Coupler head 64 includes a peripheral flange 66 which is movable into sealable engagement with cover plate 18a when the vacuum frame assembly is in its closed configuration as shown in FIG. 2. Flange 66 circumscribes port 32 and interconnects passageway 48 of frame 46 with the vacuum pump 34. With this construction, energization of the vacuum pump will draw air into passageway 46 from the area 56 below mat 52 causing mat 52 to deform into the clamping position shown in FIGS. 4 and 5. At the same time, air will be drawn through apertures 66 from atmosphere and will flow through passageway 48 within frame 46 toward the vacuum pump where it will be exhausted through exhaust 38. As previously mentioned, this continuous flow of air functions not only to maintain the mat 52 in clamping engagement with the article to be exposed but also functions to cool the vacuum pump motor and cool part 24b of enclosure 24. With this unique arrangement, no connector hoses are required to interconnect the vacuum frame assembly with the vacuum pump. Such interconnection is simply and effectively accomplished by merely moving the vacuum frame assembly into its closed operative position as shown in FIG. 2.

In operating the exposure unit of the present invention, the article to be exposed 54 is placed on glass plate 26 and vacuum frame assembly 42 is moved from the second open position shown in FIG. 1 to the first closed position shown in FIG. 2. In this position, mat 52 is in its generally planar configuration shown in FIG. 2. Energization of vacuum pump 34 will then cause air to be drawn into passageways 48 of frame 46 through apertures 58. This will cause mat 52 to deform into the clamping position shown in FIG. 4 securely clamping article 54 against the glass plate 26. At the same time, air will be drawn in from the exterior of the unit through apertures 60 and will pass through the through-flow pump 34 into portion 24b of enclosure 20. As the air passes through the pump, it will cool the pump motor as well as enclosure portion 24b and will be exhausted through the unit through exhaust port 38. Apertures 58 and 60 can be appropriately sized to achieve the desired vacuum within the space between the mat and the glass plate 26.

When the exposure cycle is completed, the vacuum frame assembly is once again lifted to the open position shown in FIG. 1. A hydraulic or spring loaded support arm 70 is provided to maintain the vacuum frame assembly in the open configuration shown in FIG. 1.

Referring again to FIG. 1, an important feature of the apparatus of the present invention is the previously identified base unit 14 which functions, not only to support the light box assembly, but also serves as a novel, light-tight film storage enclosure. In the form of the invention shown in the drawings, the base unit includes interconnected top, bottom and side walls 80, 82 and 84 respectively defining a light-tight enclosure 86. The front of the base unit is conveniently closed by a door 88 which is hingeably connected to one sidewall 82. A hollow, generally rectangularly shaped tubular bottom frame 90 supports bottom wall 84 and functions as a means for ventilating interior space 86. More particularly, bottom frame 90 is provided with a plurality of spaced apart first apertures 92 which are in communication with the exterior of the base unit and a plurality of spaced apart second apertures 94 which are in communication with light-tight enclosure 86 (see FIG. 4). It is important to note that apertures 92 extend through an inner vertical wall 96 of tubular frame 90, while apertures 94 extend through an upper wall 98 of the tubular frame. It is also important to note that apertures 92 and 94 are spaced apart so as to maintain the integrity of the light-tight enclosure 86.

As indicated in FIG. 1, the exposure unit of the present invention further includes ventilation means interconnected with first apertures 92 by means of suitable conduits 102. The ventilation means is here provided as a ventilation unit 104 which, when energized causes air to circulate through the light-tight enclosure in the manner indicated by the arrows 106 in FIG. 4.

With the construction described, film may be emplaced within the light-tight enclosure 86 by opening door 88. Once the door is closed, no light can enter the enclosure due to the unique spacing and location of ventilation apertures 92 and 94. If it is desired to circulate air through the light-tight enclosure, ventilation unit 104 can be energized causing air to circulate through the light-tight enclosure in the manner illustrated in the drawings.

Having now described the invention in detail in accordance with the requirements of the patent statutes, those skilled in the art will have no difficulty in making changes and modifications in the individual parts or their relative assembly in order to meet specific requirements or conditions. Such changes and modifications may be made without department from the scope and spirit of the invention, as set forth in the following claims.

I claim:

1. An exposure unit for exposing photo-stencil materials comprising:
    (a) a base unit;
    (b) a light box assembly mounted on said base unit, said assembly comprising:
        (i) interconnected top, bottom and side walls defining an enclosure, said top wall including a transparent portion and being provided with a vacuum port;
        (ii) a source of light mounted within said enclosure; and
        (iii) a vacuum pump mounted within said enclosure, said vacuum pump having an inlet in communication with said vacuum port in said top wall of said light box assembly;
    (c) a vacuum frame assembly connected to said light box assembly and comprising:
        (i) a hollow tubular frame having a first surface adapted to overlay said top wall of said light box assembly, said frame having interconnected walls defining an internal air passageway, one of said side walls having a first series of apertures in communication with atmosphere and another of said walls having a second series of apertures;
        (ii) connector means connected to said tubular frame for interconnecting said internal air passageway of said frame with said inlet of said vacuum pump, said connector means comprising a connector element having a first end in communication with said internal air passageway and a second end in communication with said vacuum port of said top wall of said light box assembly; and
        (iii) a flexible mat connected to said tubular frame and cooperating with said top wall of said light box assembly to define an interior space in communication with said second series of apertures in said wall of said tubular frame, whereby said vacuum pump, when energized, will exhaust the air from said interior space.

2. An exposure unit as defined in claim 1 in which said vacuum frame assembly is pivotally connected to said light box assembly for movement between a first closed position and a second open position, said first end of said connector element being adapted to overlay said vacuum port when said vacuum frame assembly is in said first closed position.

3. An exposure unit as defined in claim 1 in which said light box assembly includes an air outlet port and in which said vacuum pump includes a through-flow motor having an air outlet in communication with said air outlet port of said light box assembly whereby air will be drawn by said vacuum pump through said first series of apertures in said wall of said hollow tubular frame and will be exhausted through said air outlet port of said light box assembly.

4. An exposure unit as defined in claim 1 in which said base unit comprises interconnected top, bottom and side walls defining a light-tight enclosure.

5. An exposure unit as defined in claim 4 in which said base unit further comprises a hollow bottom frame for supporting said bottom wall of said base unit, said bottom frame having spaced apart first apertures in communication with atmosphere and spaced apart second apertures in communication with said light-tight enclosure, said second apertures being out of alignment with said first apertures.

6. An exposure unit as defined in claim 5 further including ventilation means interconnected with said hollow bottom frame for circulating air therethrough to ventilate said light-tight enclosure.

7. An exposure unit for exposing photo-stencil materials comprising:
    (a) a base storage unit including a light-tight enclosure portion;
    (b) a light box assembly mounted on said base unit, said assembly comprising:
        (i) interconnected top, bottom and side walls defining an enclosure, said top wall including a transparent portion and being provided with a vacuum port;
        (ii) a source of light mounted within said enclosure; and
        (iii) a vacuum pump mounted within said enclosure, said vacuum pump having an inlet in communication with said vacuum port in said top wall of said light box assembly and including a through-flow motor having an air inlet in communication with atmosphere;
    (c) a vacuum frame assembly hingeably connected to said light box assembly and comprising:
        (i) a hollow tubular frame having a first surface adapted to overlay said top wall of said light box assembly, said frame having interconnected walls defining an internal air passageway, one of said side walls having a first series of apertures in communication with atmosphere and another of said walls having a second series of apertures;
        (ii) a flexible mat connected to said tubular frame and cooperating with said to wall of said light box assembly to define an interior space in communication with said second series of apertures in said wall of said tubular frame, whereby said vacuum pump, when energized, will exhaust the air from said interior space.

8. An exposure unit as defined in claim 7 in which said vacuum frame assembly is movable between a first closed position and a second open position, said first end of said connector element being adapted to overlay said vacuum port when said vacuum frame assembly is in said first closed position.

9. An exposure unit for exposing photo-stencil materials comprising:
    (a) a base unit, including:
        (i) interconnected top, bottom and side walls defining a light-tight enclosure; and
        (ii) a hollow bottom frame for supporting said bottom wall of said base unit, said bottom frame having spaced apart first apertures in communication with the exterior of the base unit and spaced apart second apertures in communication with said light-tight enclosure, said second apertures being out of alignment with said first apertures;

(b) a light box assembly mounted on said base unit, said assembly comprising:
  (i) interconnected top, bottom and side walls defining an enclosure, said top wall including a transparent portion and being provided with a vacuum port;
  (ii) a source of light mounted within said enclosure; and
  (iii) a vacuum pump mounted within said enclosure, said vacuum pump having an inlet in communication with said vacuum port in said top wall of said light box assembly and including a through-flow motor having an air inlet in communication with atmosphere;
(c) a vacuum frame assembly hingeably connected to said light box assembly and comprising:
  (i) a hollow tubular frame having a first surface adapted to overlay said top wall of said light box assembly, said frame having interconnected walls defining an internal air passageway, one of said side walls having a first series of apertures in communication with atmosphere and another of said walls having a second series of apertures;
  (ii) connector means connected to said tubular frame for interconnecting said internal air passageway of said frame with said inlet of said vacuum pump, said connector means comprising a connector element having a first end in communication with said internal air passageway and a second end in communication with said vacuum port of said top wall of said light box assembly; and
  (iii) a flexible mat connected to said tabular frame and cooperating with said top wall of said light box assembly to define an interior space in communication with said second series of apertures in said wall of said tubular frame, whereby said vacuum pump, when energized, will exhaust the air from said interior space.

10. An exposure unit as defined in claim 9 further including ventilation means interconnected with said hollow bottom frame for circulating air therethrough to ventilate said light-tight enclosure.

* * * * *